United States Patent
Naumov et al.

(10) Patent No.: US 7,805,848 B2
(45) Date of Patent: Oct. 5, 2010

(54) METHOD AND DEVICE FOR DETERMINING A TRUE MERIDIAN

(75) Inventors: Michael Naumov, 10/18 Tar'ad, Ramat Gan (IL) 52503; George Naumov, Ramat Gan (IL)

(73) Assignee: Michael Naumov, Givatayim (IL)

( * ) Notice: Subject to any disclaimer, the term of this patent is extended or adjusted under 35 U.S.C. 154(b) by 167 days.

(21) Appl. No.: 11/494,655

(22) Filed: Jul. 28, 2006

(65) Prior Publication Data

US 2008/0010843 A1    Jan. 17, 2008

(51) Int. Cl.
*G01C 19/38*   (2006.01)
(52) U.S. Cl. ........................... 33/324; 33/354
(58) Field of Classification Search ............. 33/1 H, 33/268, 324, 316, 354; 702/94
See application file for complete search history.

(56) References Cited

U.S. PATENT DOCUMENTS

| 3,974,699 | A | * | 8/1976 | Morris et al. ............... 33/328 |
|---|---|---|---|---|
| 6,851,317 | B2 | | 2/2005 | Naumov et al. |
| 6,895,678 | B2 | * | 5/2005 | Ash et al. .................... 33/313 |
| 7,155,837 | B2 | * | 1/2007 | Cho et al. .................... 33/356 |
| 2004/0172838 | A1 | * | 9/2004 | Satoh et al. ................. 33/316 |
| 2005/0204571 | A1 | * | 9/2005 | Mies et al. ................... 33/503 |
| 2006/0010699 | A1 | * | 1/2006 | Tamura ..................... 33/355 R |
| 2007/0067128 | A1 | * | 3/2007 | Vock et al. ................... 702/94 |
| 2009/0095208 | A1 | * | 4/2009 | Cardoza et al. ........... 33/27.02 |

OTHER PUBLICATIONS

Mohinde S.Gremal—Global Positioning Systems "Inertial Navigation Integration", Dec. 2000,John Wiley, ISBN 047135032x.

* cited by examiner

*Primary Examiner*—G. Bradley Bennett

(57) ABSTRACT

The technical solution provided enables it to determine true meridian of an unmovable object on the Earth, and when moving at constant velocity true track angle. This solution is based on fixation of true meridian by zero value of linear acceleration with induced rotating points of determining pressure around the vertical. Said determinations are implemented quickly and accurately, irrespective of the disturbing factors influence, in particular, electromagnetic and magnetic fields, weather conditions, vibrations, cross accelerations, temperature and others.

3 Claims, 1 Drawing Sheet

METHOD AND DEVICE FOR DETERMINING A TRUE MERIDIAN

FIELD OF ART

Figure 1:
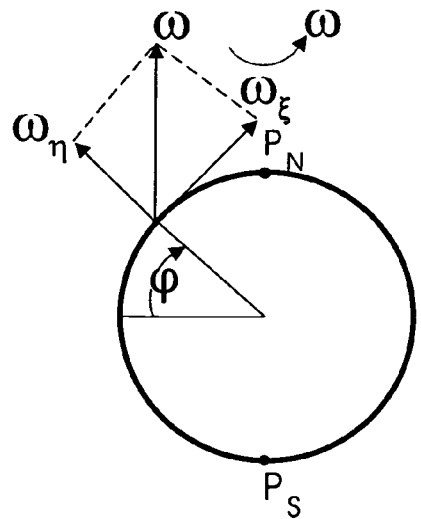

The present technical solution can be used in the systems of autonomous navigation and for terrain orientation.

BACKGROUND OF THE INVENTION

True meridian is considered to be the geometrical place of the points of the Earth surface equal to the geographical longitude.

For determining true meridian (its location on the Earth surface) use is made of different methods: magnetic, astronomic, and gyroscopic [1].

The main remarkable drawbacks of the magnetic method are necessity of knowing and taking into account magnetic inclination and magnetic deviation as well as low accuracy. This method is implemented by the compasses: magnetic, gyro magnetic and gyro inductive.

The main remarkable drawbacks of the astronomic method are impossibility of using when heavenly bodies being invisible, as well as necessity of knowing the coordinates of the location and the time of determining the course.

The main remarkable drawbacks of the gyroscopic method are long duration of determining true meridian (dozens of minutes), big weight, big dimensions and higher cost of gyrocompasses implementing said method. The principle of the operation of a gyrocompass is based on the precession of the gyroscope relative to the horizontal projection of the Earth rotation angular velocity vector.

An object of this technical solution is to provide quick and accurate determination of true meridian (its location) irrespective of the disturbing factors influence, in particular, electromagnetic and magnetic fields, weather conditions, vibrations, temperature and others.

SUMMARY OF THE INVENTION

For achieving said goal there is provided a method for determining true meridian on any object at rest based on fixing zero signal of a linear velocity component (linear acceleration) by pressures difference equal to zero in particular points of a sensor (device) for measuring (determining) horizontal acceleration [2], they being rotated around the vertical through induced way.

Under linear velocity we mean the velocity whose vector W is at a tangent to the horizontal trajectory of movement in the inertial space.

The movement of a moving object in the horizontal plane (rotating in the inertial space together with the Earth and due to the movement of a moving object relative to the Earth) can be considered as the rotation around the axis perpendicular to the plane of rotation passing through the vertical with angular velocity $\omega$.

The plane, wherein there occurs rotation with angular velocity $\omega$ we will call the plane of rotation; the straight line perpendicular to said plane—the line of fixation; trajectory passing in the horizontal plane through the location of a moving object—trajectory of rotation, accordingly.

In particular, for any object at rest, the trajectory of rotation in the inertial space is considered to be the parallel and the line of fixation—true meridian, accordingly.

Previously, the authors developed the device for determining horizontal acceleration [2]. The axis of sensitivity $\xi$ of said device is horizontal, irrespective of permissible tilting in the operating condition. With rotating said device around the axis $\eta$ directed along the vertical (including induced rotation relative to the Earth) with angular velocity $\omega_\eta$, alongside with the former there also rotates the axis of sensitivity $\xi$ (remaining horizontal therewith).

With said induced rotation, the projection $W_\xi$ of vector W on the axis of sensitivity $\xi$ changes in terms of value (module). Said projection is the highest possible (by module) with locating the axis $\xi$ at a tangent to the parallel and equal to zero with locating said axis $\xi$ at a tangent to true meridian.

With such change there occurs linear acceleration at $\alpha_\xi$ ($\alpha_\xi$=$W_\xi$), determined by said device being rotated.

In case with said induced rotation, the axis $\xi$ is directed to the east from true meridian, then with crossing the line of superposition of the axis $\xi$ with the direction of vector W, the sign $\alpha_\xi$ changes "+" for "−" ($\alpha_\xi$>0 changes with said crossing for $\alpha_\xi$<0). And vice versa, in case with said induced rotation, the axis $\xi$ is directed to the west from true meridian, then with crossing the line of superposition of the axis $\xi$ with the direction opposite to the direction of vector W the sign $\alpha_\xi$ changes from "−" for "+" ($\alpha_\xi$<0 changes with said crossing for $\alpha_\xi$>0).

Such opposite sequence of changes of accelerations signs (+÷− and −÷+) enables it to have an opportunity by means of a special discriminator of the sequence of changes of said signs to automatically eliminate possible error (180°) in determining the direction of vector W, i.e. to stop induced rotation only with superposition of the axis of sensitivity $\xi$ with vector W directed at a tangent to the parallel from the west to the east.

Moreover, practically for any object at rest the error by 180° is easy to avoid (by knowing the parts of the world, comparing with the indications of other compasses, according to the location of heavenly bodies, by means of the geographical map, by means of characteristic signs on the area).

It should be kept in mind that in conformity with the above mentioned (in particular, taking into account the change of the sign $W_\xi$) in the process of said induced rotation, when crossing the line of superposing the axis $\xi$ with line of fixation, the sign $a_\xi$ does not change ($a_\xi$<0) and $a_\xi$≠0 herewith.

Let's consider in more detail the case of determining true meridian on any object at rest. For the above, let's resolve an angular velocity $\omega$ of rotating the Earth into two components: horizontal $\omega_\xi$ and vertical $\omega_\eta$. Presence of $\omega_\xi$ means rotating around true meridian and herewith vector of linear velocity W is directed along the parallel (in the eastern direction, at the angle 90° to true meridian).

By induced rotating around the vertical of said device for determining horizontal acceleration its zero input signal is achieved, which corresponds to the superposition of its axis of sensitivity $\xi$ with the direction of vector W of linear velocity caused by the Earth rotation. With such superposition, induced rotation stops (fixation takes place), and the axis of fixation (perpendicular to the axis $\xi$) shows true meridian directed from the south to the north. Fixing axis is marked on the body of the device for horizontal acceleration measurement, in particular on its vessels.

Any harmful influence of the centripetal accelerations caused by the rotations with the components $\omega_\xi$ and $\omega_\eta$. of angular velocity of the Earth rotation as well as by the induced rotation around the vertical is expected to be automatically avoided by using symmetrically located two points of determining pressure (relative to the axis of the induced rotation superposed with the vertical) and by using differential scheme the signals of pressures are provided whereto in said points.

One of the possible devices for implementing the method provided comprises an electric motor, a device for determining horizontal acceleration [2] and a control circuit interconnected with each other. Herewith, the axle (shaft) of a rotor of an electric motor (the axle of an electric motor) is located along the vertical of location.

The device for determining horizontal acceleration comprises two miniature sealed vessels filled with the flowing medium (liquid, gas or their mixture) containing (connected with said vessels) pressure sensors, differential scheme (differential block), said pressure sensors being connected whereto. The output signal of said differential scheme is the output signal of the device for determining horizontal acceleration. The inner cavities of said vessels are considered to be similar. The contours of the cross-sections of said cavities are considered to be asymmetrical, similar and counter-oriented. Asymmetry of each contour is chosen relative to the straight line containing upper and lower points. Counter-orientation is implemented by locating the extreme points of said contours along the horizontal on either side from said points of determining pressure.

Said points of determining pressure are similarly located in the inner cavities on the similar parallel straight lines (at similar distances from the upper points and at similar distances from the lower points of said contours). These upper and lower points with permissible tilting in the operating condition are considered to remain as such (upper and lower). This enables the opportunity of using the technical solution provided on moving objects for determining the location of the orbit of their movement (true track angle) with constant velocity.

The plane, wherein there are located said contours, can be called the plane of determination.

The signals of pressures in the points of determining pressure are provided to the differential scheme, wherein the signal of pressure of one point is subtracted from the signal of pressure of another point.

The difference of pressures signals in said points is considered to occur only in case of the acceleration acting in the plane of determination along the line of its crossing with the horizontal plane. Under the influence of the acceleration in any other direction (its component, to be more exact) and in any other plane the difference of said signals will be equal to zero, since the points of determining pressure are acted upon in this case by columns of the flowing medium of similar length. This is explained by the similarity of the inner cavities of the vessels and similar location of the points of determining pressure in said points.

The vessels are fastened on the axle of an electric motor, it being so located along the vertical that said parallel straight lines be parallel to said axle and be located symmetrically relative thereto. With such fastening, the points of determining pressure turn also out to be located symmetrically relative to the axle of an electric motor. Such location is expected to prevent any harmful influence of centripetal accelerations occurring with rotating around the vertical, including those caused by rotating a rotor of an electric motor.

The control circuit comprises, in particular, a switch-on/off button with a spring, an electromagnet and a relay. When pushing said button, a rotor of an electric motor starts rotating. Herewith, in correspondence with the above mentioned there occurs acceleration acting in the plane of determination. As a consequence, the pressure in one point of determining pressure increases, and in another point of determining pressure it either decreases or does not change (in case of definitely horizontal location of said device). Therefore, at the output of the differential scheme (at the output of the device for determining horizontal acceleration) there occurs a signal which is provided to the control circuit, in particular, to the relay. Owing to that, said relay snaps into action, its contacts close and it is through the latter that power supply is provided to the electromagnet. The electromagnet holds the button in a switch-on position till the relay is de-energized, which will cause breaking its contacts, as a result of it, the electromagnet will be de-energized and the switch-on/off button under the influence of its spring will return to the initial position. Herewith, the circuit of an electric motor is de-energized and its rotor stops. The axis of sensitivity $\xi$ of said device, herewith, is expected to be superposed with vector of linear velocity (with the eastern direction of the geographical parallel of location), which enables it to fix true meridian (for example, by means of heading line) perpendicular to this vector.

Thus, the moment of determining true meridian is implemented by superposing the axis of sensitivity $\xi$ with vector W of linear velocity by de-energized position of the control circuit and stop of a rotor of an electric motor.

It should be kept in mind that since the sensitivity threshold of said device for determining horizontal acceleration is equal to zero, and disturbing factors are not practically considered to make any harmful influence, there is no principal obstacles for implementing technical solution provided with higher accuracy meeting the highest requirements.

Thus, the method provided comprises the following stages:
 location of the points of determining pressure of a device for determining
 horizontal acceleration being asymmetrical relative to the vertical, induced rotation of said points around the vertical,
 fixation of true meridian by zero signal of linear acceleration by means of stopping said induced rotation with superposing the axis of sensitivity of said device with the direction perpendicular to true meridian.

BRIEF DESCRIPTION OF THE INVENTION

Figure 2:
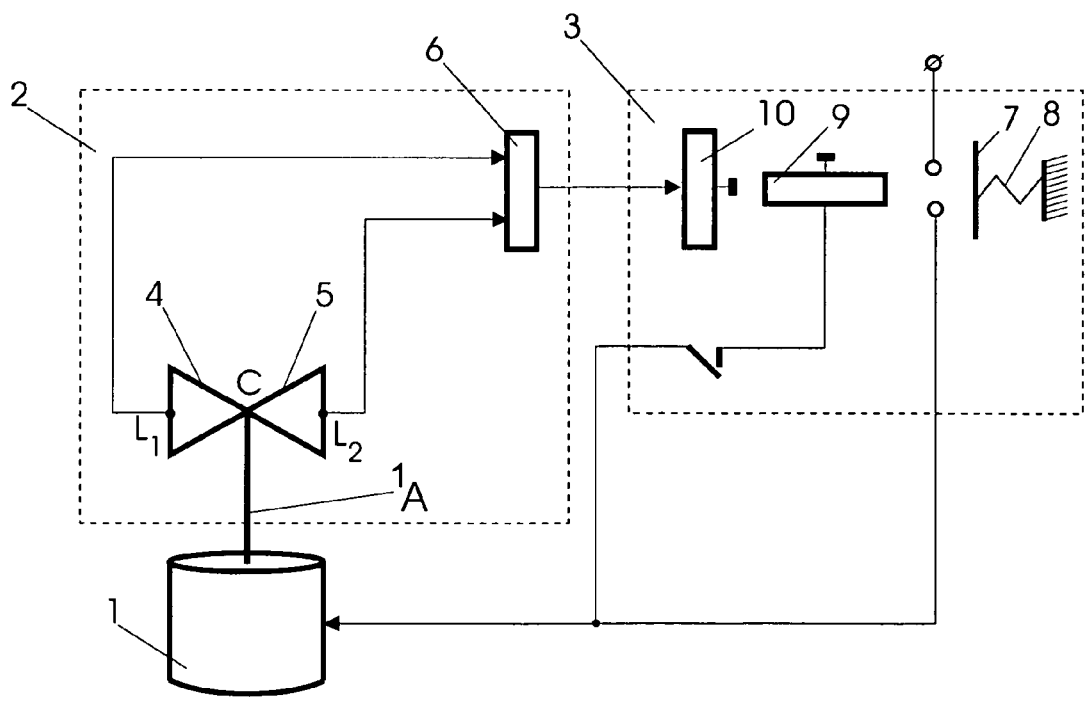

The technical solution provided is explained and illustrated in the accompanying drawings, in which:

FIG. 1—serves for showing vector components of angular velocity of the Earth rotation, FIG. 2—a scheme of a device implementing the method provided.

In the drawings the pressure sensors are not shown, and the points wherein determination of pressure is made by said sensors are shown.

DETAILED DESCRIPTION OF THE INVENTION

The method provided is based on the fixation of the direction of vector of linear velocity by linear acceleration equal to zero to be determined by zero difference of pressures in the points located symmetrically around the vertical and induced rotating around it.

Said points are located in the similar inner cavities of the vessels similarly on the parallel straight lines located along the vertical.

In FIG. 1 there is shown a plane of true meridian passing through the North Pole $P_N$ and the South Pole $P_s$.

In the immovable point of the Earth located at the latitude $\phi$, vector of angular velocity $\omega$ of the Earth rotation itself is resolved into two components: horizontal $\omega_\xi$ located in the direction true meridian and vertical $\omega_\eta$ located along the vertical.

In FIG. 2 there is shown a scheme of one of the possible devices implementing the method provided for determining true meridian on any object at rest.

Said device comprises an electric motor 1, axle $1_A$ thereof is positioned along the vertical, a sensor (device) for measuring (determining) horizontal acceleration 2 [2] and a control circuit 3 interconnected with each other.

The device 2 comprises two sealed miniature vessels filled with the flowing medium (liquid, gas or their mixture, asymmetrical contours 4 and 5 of the cross-sections of similar inner cavities whereof are similar and counter-oriented. Each of said vessels is provided with a pressure sensor, the signals whereof are provided to the differential scheme (differential block) 6, the signal whereof is provided to the control circuit 3.

The contours 4 and 5 comprise parallel straight lines containing upper and lower points (remaining as such, i.e. upper and lower with permissible tilting in the operating condition). On said lines there are similarly located points of determining pressure $L_1$ and $L_2$ to be determined by pressure sensors. The contours 4 and 5 are counter-oriented by locating along the horizontal the extreme points (the outermost) points of said counters shown in FIG. 2, they being superposed into one point (marked by the letter C) on either side from the points $L_1$ and $L_2$ (on either side from said parallel straight lines).

Said vessels are fastened on the axle $1_A$ of a rotor of an electric motor, it being located along the vertical (in FIG. 2 this axle is passing through the point C). They are fastened in such a way that said straight lines be parallel to the axle of a rotor of an electric motor.

As pressure sensors use can be made of any known sensors of such type, semiconductor type being preferable, whose specific resistance changes under the influence of pressure. Pressure sensors are not shown and there are shown points $L_1$ and $L_2$, wherein pressure determination is made by said sensors.

As a differential scheme (differential block) use can be made of an electrical bridge, a magnetic amplifier by the differential scheme or a scheme of difference of electrical parameters (active, capacitance or inductive resistances).

The control circuit comprises a switch-on/off button 7 with a spring 8, an electromagnet 9 and a relay 10.

In case in the plane of determination there acts an acceleration along the line of crossing said plane with the horizontal plane (along the axis of sensitivity $\xi$), it makes an influence on the horizontal column at length $CL_1$. and $CL_2$ in each vessel. Herewith, the pressure in one of the points $L_1$ and $L_2$ increases, and in another—either does not change or increases, accordingly. Thus, in this case at the output of the device 2 (at the output of the differential scheme 6) there occurs a signal. Such acceleration occurs with induced rotation of the vessels around the vertical (the plane of determination rotates wherewith as well), since, herewith, there changes a value of linear velocity in the direction of said line of crossing (the axis of sensitivity $\xi$). In particular, if the plane of determination is directed perpendicularly to true meridian, then said linear velocity is the highest possible, and if it is directed along true meridian, then said velocity is equal to zero.

Centripetal accelerations caused by the rotations with angular velocities $\omega_\xi$ and $\omega_n$ owing to the similarity of inner cavities of vessels, similarity of the location of the points $L_1$ and $L_2$ therein, are not expected to cause changes at the output of the device 2.

Centripetal accelerations caused by the rotations of a rotor of an electric motor are not expected to cause such changes either, since the points of determining pressure are located symmetrically relative to the axle of a rotor of an electric motor.

Thus, the signal at the output of the device 2 is expected to cause only linear acceleration acting along said line of crossing, it caused by the rotation with angular velocity $\omega_n$ and the rotation of a rotor of an electric motor.

The operation of the device implementing the method provided (FIG. 2) is given below.

When pushing a button 7, there is provided power supply to an electric motor 1. With rotating its rotor, there occurs linear acceleration acting along said line of crossing (along the axis of sensitivity $\xi$). Therefore, at the output of the differential scheme 6 there occurs a signal coming to the relay 10. The contacts of said relay close and it is through them that power supply is provided to the electromagnet which is considered to hold the switch-on/off button in "on" position. When in the process of rotating the plane of determination superposes with the direction of vector of linear velocity, said acceleration will become equal to zero, the relay 10 will be de-energized (made dead), its contacts will become broken, the electromagnet 9 will be de-energized, a button 7 under the influence of a spring 8 will return to the initial position, and a rotor of an electric motor will stop. Herewith, the plane of determination is expected to superpose with the direction of vector of linear velocity, thereby true meridian will be determined (it being perpendicular in this case to the plane of determination).

Novel features of the present technical solution are new solution for determining the direction of vector of linear velocity, the position of true meridian of an unmovable object on the Earth and true track angle with a moving object moving with constant velocity.

The main remarkable advantages and merits of the technical solution provided are as follows:

- compared with the magnetic method there is independence of the operation from the electromagnetic and magnetic fields;
- compared with the astronomic method there is independence from weather conditions, in particular, from the visibility of heavenly bodies without having any special knowledge of the location coordinates and the time of determinations;
- compared with the gyroscopic method there is quick determination of the direction of true meridian, the opportunity of applying on spacecrafts, simplicity, low cost, compactness, low weight, independence from the action of disturbing factors (in particular, vibrations, temperature, etc.);
- an opportunity to use in high latitudes.

Notes

1. In case of necessity, use can be made of amplifiers, correcting units (damping and others), a brake arrangement (in a electric motor) as well as transformation can be made of alternating current into direct current, and vice versa.
2. We are applying to you with request to give the names below to the inventions provided:
   "Naumov, Method for determining true meridian on the Earth",
   "Naumov, Device for determining true meridian on the Earth".
3. Due to the declining years of Mr. M. Naumov (born in 1926) we would be very obliged if you could reduce the terms of conducting the expertise of the application for the invention provided.

We claim:

1. A method for determining true meridian of any object at rest comprising the following stages:

rotation of vessels incorporated into a sensor for measuring horizontal acceleration by means of an electric motor around a vertical of any object at rest, said vessels including pressure determination points symmetrically positioned with respect to the vertical of the object, stopping the rotation of the vessels when attaining a zero signal of linear acceleration, determining the true meridian by position of a perpendicular in a horizontal plane to an axis of sensitivity of the said sensor for measuring horizontal acceleration.

2. A device for determining true meridian of any object at rest, fixed on this object and comprising the following parts interconnected with each other:

an electric motor with its shaft positioned along a vertical of the object, a control circuit connected to the said electric motor, a sensor for measuring horizontal acceleration comprising vessels filled with flowing medium and provided with pressure sensors, the pressure sensors symmetrically positioned on a shaft of the electric motor and connected to the said control circuit.

3. The device according to claim 2, wherein the control circuit comprising an on/off button, electromagnet and relay, the button and relay interconnected with each other, and both of them connected to the said electric motor, the electromagnet connected to the said button.

* * * * *